Dec. 3, 1935.  B. BISCHOF  2,022,841
TWO-CYCLE INTERNAL COMBUSTION ENGINE
Filed Feb. 9, 1931  4 Sheets-Sheet 4
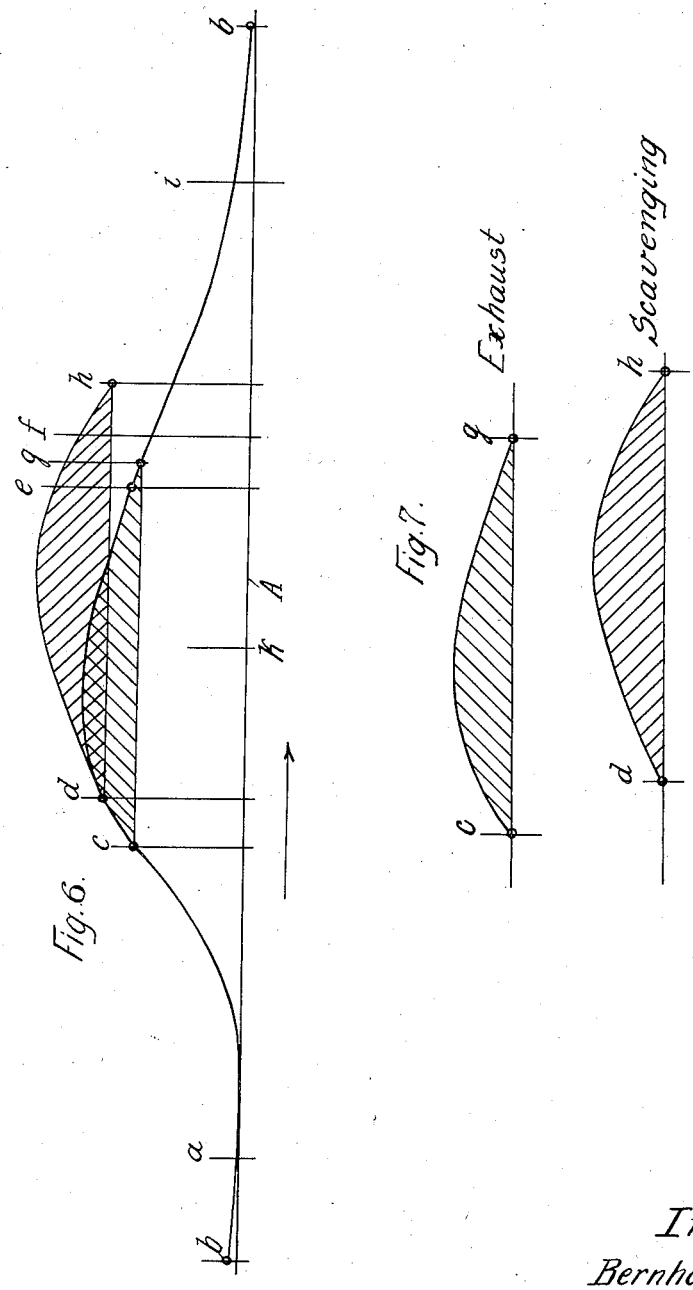
Inventor:
Bernhard Bischof
by Karl...
Atty.

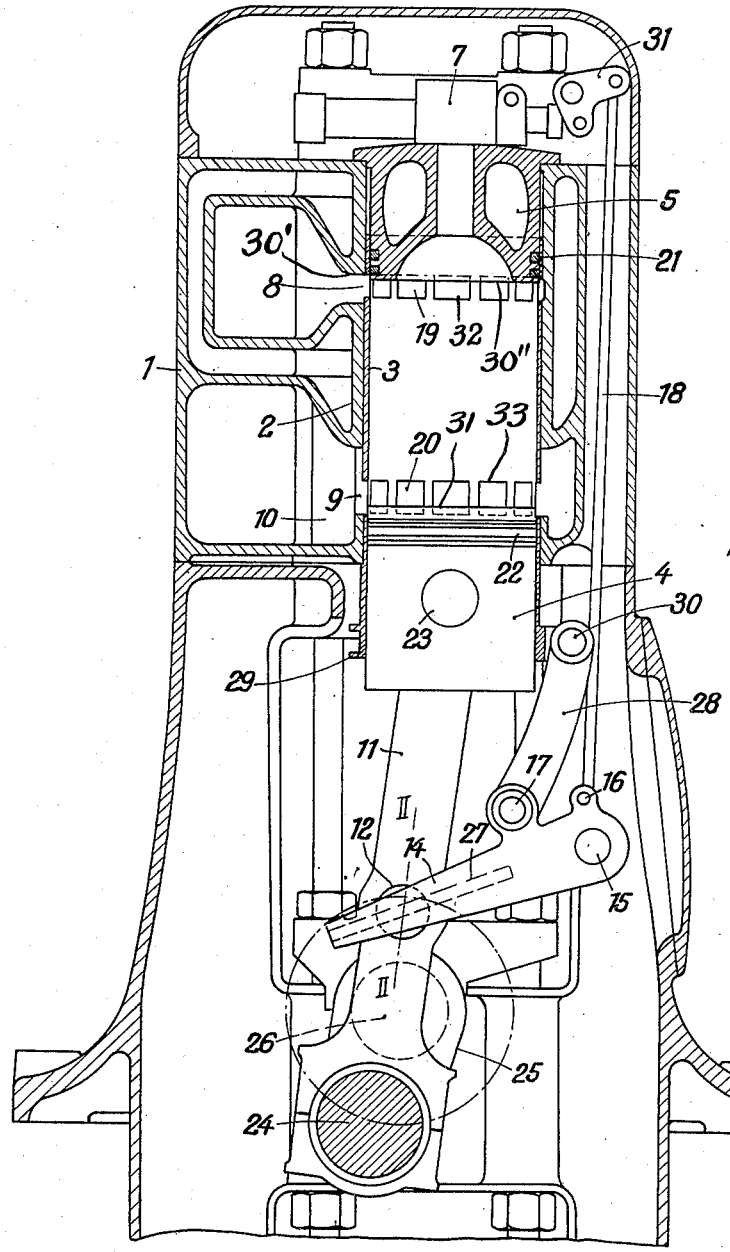
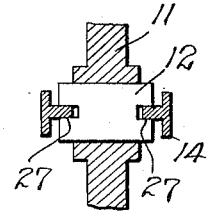

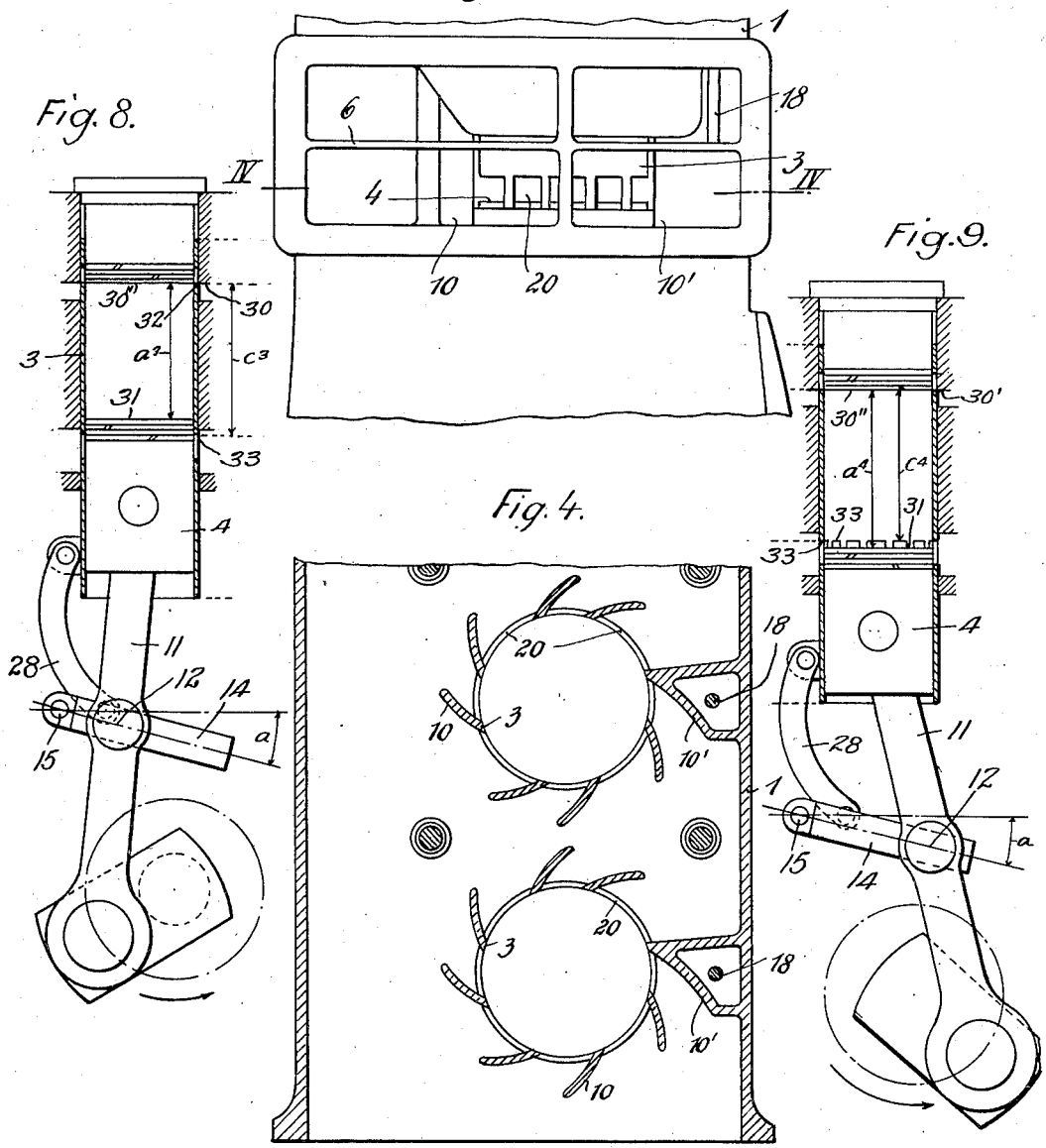

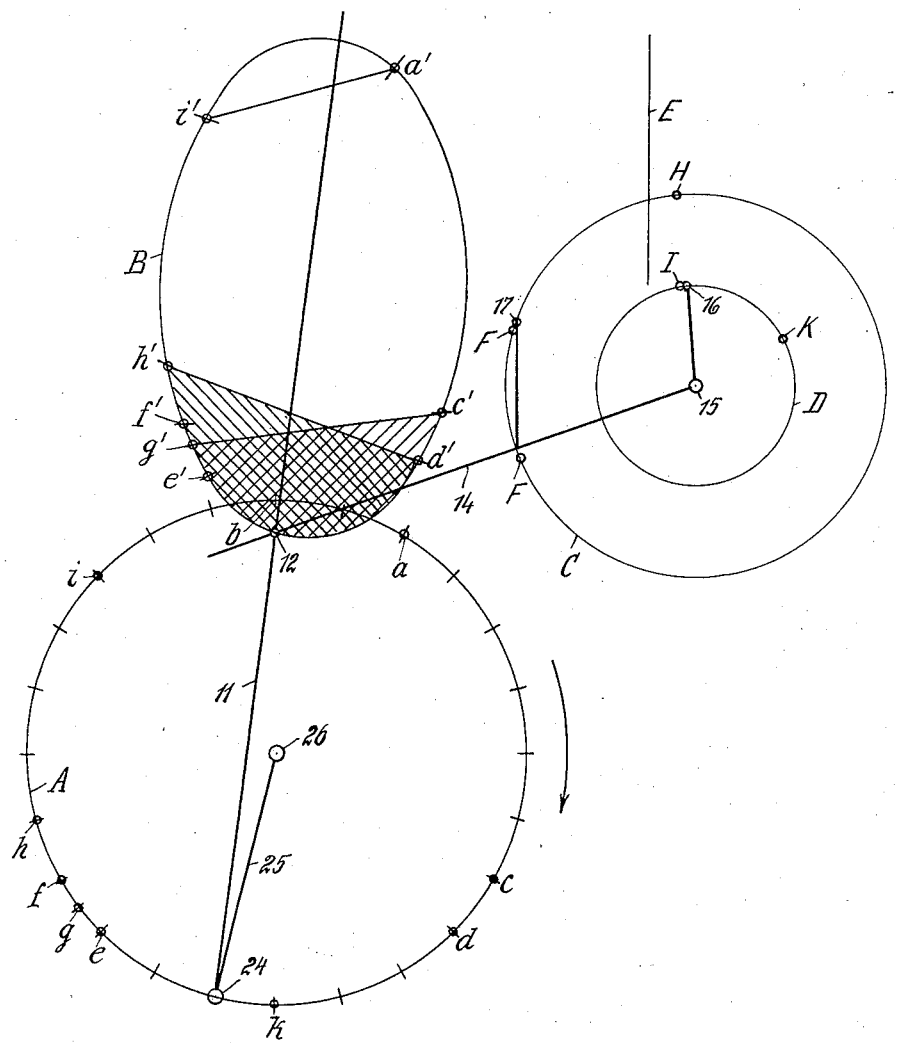

Patented Dec. 3, 1935

2,022,841

UNITED STATES PATENT OFFICE 2,022,841

TWO-CYCLE INTERNAL COMBUSTION ENGINE

Bernhard Bischof, Waldheim-Winterthur, Switzerland

Application February 9, 1931, Serial No. 514,539
In Germany February 10, 1930

9 Claims. (Cl. 123—65)

My invention relates to two-cycle internal combustion engines and more particularly to engines having a sleeve mounted to slide in the cylinder and surrounding the piston of the engine, this sleeve serving to control the admission and exhaust ports of the cylinder It has already been suggested to provide means connected to the connecting rod of the engine for operating the sleeve. The sleeve was operated under the same velocity conditions during the expansion and the compression stroke of the engine.

It is an object of my invention to improve an engine of this type. To this end instead of the aforesaid means I provide a mechanism between the connecting rod and a rocking lever for reciprocating the lever which mechanism during the expansion stroke moves to the shortest distance from the point about which the rocking lever rocks, while during the compression stroke it moves to the longest distance from the point of the piston. By these means the sleeve is caused to move at a higher medium speed during the expansion than during the compression stroke.

My invention has particular reference to two-cycle engines for comparatively high speeds such as vehicle engines. Designing a suitable, for instance Diesel engine for low speeds is quite easy but if speeds of the order of 1000 to 1200 revolutions per minute are required as is usual in up-to-date vehicle engines, and if at the same time the power demand is high, difficulties arise under which the majority of the present two-cycle engines fail.

The power of a two-cycle engine is not only determined by effective scavenging but also by proper charging of the cylinders. These conditions are not fulfilled in engines as designed heretofore, and particularly a sufficiently large area for the admission of the scavenging air has never been provided for. The charging of the cylinder should be effected only after the exhaust port has been throttled to a considerable extent or better still has been closed. By providing two distinct speed conditions for the expansion and the compression stroke of the engine the two conditions, i. e. large area of the scavenging ports and effective charging of the cylinders, are fulfilled.

As the dead centers of the sleeve do not coincide with the dead centers of the piston, a fuel-injection pump may be operated from the sleeve-operating lever, so that the means usually employed for operating the pump can be dispensed with, whereby an important simplification of the engine is obtained.

Preferably the cylinder and the piston are made of a material which is softer than that of the sleeve in order to prevent seizing. This offers the further important advantage that as the heat-expansion coefficient of soft materials is higher than that of hard materials, the expansion of the cylinder will be greater than that of the sleeve and therefore, even at high performance, the sleeve is allowed sufficient play in the cylinder. Preferably the sleeve is made of nitration-hardened steel, while the cylinder and the piston are made of light metal or alloy.

In the drawings affixed to this specification and forming part thereof an engine of the Diesel type embodying my invention is illustrated diagrammatically by way of example together with diagrams relating to its operation.

In the drawings

Fig. 1 is a sectional elevation of the engine,

Fig. 2 is a section on the line II—II in Fig. 1,

Fig. 3 is an elevation showing the air-inlet duct of a carburetor engine,

Fig. 4 is a section on the line IV—IV in Fig. 3,

Fig. 5 is a diagram showing the movements of its mechanism,

Fig. 6 is a diagram showing the stroke of the sleeve plotted against time, and

Fig. 7 is a diagram showing separately the opening curves for the scavenging and exhaust ports from Fig. 6.

Figs. 8 and 9 are axial sections showing the sleeve valve and piston and the parts governing same in two positions of operation.

Referring now to the drawings and first to Figs. 1 and 2, any number of cylinders 2 may be provided in a crank case 1. 3 is a sleeve which is mounted to slide in the cylinder and is formed with exhaust slots 19 for cooperation with the exhaust ports 8 and with inlet slots 20 for the scavenging ports 9. 30' are controlling edges at the inner ends of the exhaust ports 8 in the cylinder 2 and 30" is a controlling edge at the inner end of the cylinder head 5, for cooperation with the exhaust slots 19 in the sleeve 3. 32 are the outer edges of the exhaust slots 19. 5 is the cylinder head which is formed with a projection extending into the cylinder 2, the sleeve 3 moving in an annular clearance between the skirt of the piston head and the wall of the cylinder, and 21 are packing rings on the projection of the cylinder head. Mounted to slide in the sleeve 3 is the piston 4 with its packing rings 22. 31 is a controlling edge at the inner end of the piston 4 for cooperation with the inlet slots 20 and their inner edges 33. 23 is the gudgeon pin of the piston, 11 is the connecting rod, 24 is the crank pin on which the big end of the connecting rod operates, 25 is the crank, and 26 is the crank shaft.

15 is a pivot in the crank case 1, 14 is a rocking lever on the pivot, 12 is a notched pin which is mounted to turn in a bore of the connecting rod 11, with its outer ends slotted, as best seen in Fig. 2. 27 are ribs on the forked rocking lever 14 which is fitted to slide in the notch of the pin 12. 17 is a pintle on the rocking lever, 28 is a link which is connected to the pintle 17 at one end, 29 is a bracket on the end of the sleeve 3 which projects from the cylinder 2, and 30 is a pintle in the bracket to which the other end of link 28 is connected. 16 is another pintle on the lever 14, 18 is a rod extending upwardly from the pintle 16, 31 is a bell-crank lever to which the upper end of the rod 28 is connected, and 7 is a fuel-injection pump on the cylinder head 5 the piston of which is reciprocated by the bell-crank lever 31.

When the piston 4 reciprocates the notched pin 12 of the connecting rod 11 imparts rocking movement to the lever 14 about its pivot 15 through the medium of the ribs 27. The effective arm of the lever 14 varies as the piston 4 reciprocates notwithstanding the constant angular velocity of the crank pin 24, as will be explained with reference to Fig. 5, as and for the purpose specified, the pin 12 moving nearest to the pivot 15 during the expansion stroke of the sleeve 3, and moving farthest away from it during the compression stroke of the sleeve.

Instead of a scavenging pump on the cylinder head 5, a sparking plug, not shown, might be provided in the head. Normally the engine is of the Diesel type in which a sparking plug is not required. Preferably guiding vanes 10 are arranged ahead of the scavenging ports 9 for imparting whirling motion to the inflowing air or mixture.

Referring now to Figs. 3 and 4, a horizontal partition 6 is provided for subdividing the outlet ports 9 into an upper and a lower set. Fig. 4 shows the position of the vanes 10 which are also provided in the engine illustrated in Figs. 1 and 2. The vanes in the vicinity of the rods 18 for the operation of the fuel-injection pump 7 are preferably designed as casings 10' surrounding the rods 18.

Referring now to the diagrams and first to Fig. 5, A is the circle described by the crank pin 24, B is the elliptical curve described by the notched pin 12 on the connecting rod 11, C and D are the circles described by the pintles 17 and 16, respectively, and F, H, and I, K are the respective final positions of the pintles on their circles. Obviously the effective arm of the lever 14 varies as the lever is rocked about its pivot 15 by the rod 11, the effective arm being a minimum when the sleeve 3 uncovers the exhaust ports 8, and a maximum when it closes the scavenging ports 9. The result of the varying leverage is that the medium speed of the sleeve is higher during expansion than during compression, the speed being a maximum at the beginning of the exhaust, whereupon it becomes zero and increases again at the moment the scavenging ports 9 are closed. At the beginning of the exhaust the speed of the sleeve is equal to or higher than the speed of the piston 4. Preferably the sleeve lags with respect to the piston at the upper and leads at the lower dead center.

The circle A described by the crank pin 24 is divided into 24 parts at 15 degs. each, as indicated by the short lines in Fig. 5. Fuel is injected at $i$, (or $i'$ on the elliptical curve B) and the injection is completed at $a$ (or $a'$). Expansion occurs between $a$ and $c$ ($a'$ and $c'$), and at $c$ ($c'$) the exhaust slots 19 in the sleeve 3 have just moved past the inner end of the cylinder head 5, exposing the exhaust ports 8 and starting the exhaust. At $d$ the speed of the sleeve 3 exceeds the speed of the piston 4, the slots 20 in the sleeve begin to register with the scavenging ports 9 and scavenging is continued until the point $g$ ($g'$) between the dividing points $e$, $f$, ($e'$, $f'$). At the point $g$ ($g'$) the exhaust is closed, the slots 19 in the sleeve 3 rising beyond the lower edge of the projection on the cylinder head 5. The cylinder is charged with scavenging air until $h$ ($h'$) where the speed of the piston 4 increases beyond the speed of the sleeve 3 and the piston 4 closes the scavenging ports 20. The air is now compressed, and fuel is injected, or ignition is effected, from $i$ ($i'$) to $a$ ($a'$) unless interrupted at an earlier period by regulating means, not shown.

The mechanism illustrated might be modified by pivoting the rocking lever 14 to the connecting rod 12 and mounting the pivot 15 of the rocking lever to slide in suitable guides (not shown). Obviously by such a modification under otherwise equal conditions, the operation of the gear would not be influenced. For varying the operation of the gear, the length of rocking lever 14 is varied by arranging its pivot 15 in another position. For instance, if the pivot 15 is displaced to the left from the position illustrated in Figs. 1 and 5, the stroke of the sleeve 3 is increased. If it is desired that the speed of the sleeve at the moment when the exhaust ports 8 are exposed should exceed the speed of the piston 4 the mechanism must be modified so that the circle C intersects with the elliptical curve E.

Referring now to Figs. 6 and 7, the circle A is here shown as a straight line and the strokes of the sleeve 3 are plotted as ordinates against this line. $b$ is the upper, and $k$ is the lower dead center. The area of curve $c$, $g$ which is sectioned from the left to the right, and shown separately in Fig. 7, indicates the exhaust, and the area of curve $g$, $h$ which is sectioned from the right to the left, indicates the scavenging period, the ordinates in both curves being the exposed heights of the port areas. In order to calculate the area the heights are multiplied with the total perimeter of the slots 19 and 20, respectively. The heights are found by projecting the length of the link 28 on the vertical line E in Fig. 3 on the circle C and measuring the values found on this line.

It will appear from the curves that the exposed areas are very large notwithstanding the small stroke of sleeve 3. The injection stroke of fuel pump 7 is completed only at $a$ notwithstanding the fact that the upper dead center of the piston 4 is at $b$, which permits continuing the injection of the fuel after the upper dead center has been moved through.

I wish it so be understood that I do not desire to be limited to the exact details of construction shown and described, for obvious modifications will occur to a person skilled in the art.

In the claims affixed to this specification no selection of any particular modification of the invention is intended to the exclusion of other modifications thereof and the right to subsequently make claim to any modification not covered by these claims is expressly reserved.

I claim:—

1. In a two-cycle internal combustion engine having a cylinder, a port-controlling sleeve mounted to reciprocate in said cylinder, a piston mounted to reciprocate in said sleeve, a connecting rod and a rocking lever operatively connected to said sleeve, mechanism for operatively connecting said rocking lever and said connecting rod and including a part mounted to turn in one of the two connected members and a pivot on the other member adapted to engage said part, which mechanism is so positioned with respect to the point about which said rocking lever is rocked that it moves to the shortest distance from the point about which said rocking lever rocks during the expansion stroke, and moves to the longest distance from said point during the compression stroke, of said piston.

2. In a two-cycle internal combustion engine having a cylinder, a port-controlling sleeve mounted to reciprocate in said cylinder, a piston mounted to reciprocate in said sleeve, a connecting rod and a rocking lever operatively connected to said sleeve, a pin mounted to turn in said connecting rod and supporting said rocking lever, said pin being adapted to slide lengthwise of said lever, which pin is so positioned with respect to the point about which said rocking lever is rocked that it moves to the shortest distance from the point about which said rocking lever rocks during the expansion stroke, and moves to the longest distance from said point during the compression stroke, of said piston.

3. In a two-cycle internal combustion engine, a cylinder having rows of inlet and exhaust ports at opposite ends, a tubular sleeve valve which is adapted to reciprocate in said cylinder and to control said ports and has inlet and exhaust slots at opposite ends, a controlling edge on said cylinder for cooperation with one group of slots in said sleeve, a piston mounted to reciprocate in said sleeve and having a controlling edge at its inner end for cooperation with the other group of slots in said sleeve, a connecting rod operatively connected to said piston, a fixed pivot, a lever mounted to oscillate about said pivot, a joint directly connecting said lever to said connecting rod and adapted to vary the effective length of said lever, and a link connecting said lever to said sleeve.

4. In a two-cycle internal combustion engine, a cylinder having rows of inlet and exhaust ports at opposite ends, a tubular sleeve valve which is adapted to reciprocate in said cylinder and to control said ports and has inlet and exhaust slots at opposite ends, a controlling edge on said cylinder for cooperation with the exhaust slots in said sleeve, a piston mounted to reciprocate in said sleeve and having a controlling edge at its inner end for cooperation with the inlet slots in said sleeve, a connecting rod operatively connected to said piston, a fixed pivot, a lever mounted to oscillate about said pivot, a joint directly connecting said lever to said connecting rod and adapted to vary the effective length of said lever, and a link connecting said lever to said sleeve.

5. In a two-cycle internal combustion engine, a cylinder having rows of inlet and exhaust ports at opposite ends, a tubular sleeve valve which is adapted to reciprocate in said cylinder and to control said ports and has inlet and exhaust slots at opposite ends, a controlling edge on said cylinder for cooperation with the exhaust slots in said sleeve, a piston mounted to reciprocate in said sleeve and having a controlling edge at its inner end for cooperation with the inlet slots in said sleeve, a connecting rod operatively connected to said piston, a fixed pivot arranged at that side of the connecting rod toward which said rod moves during the expansion stroke of the piston, a lever mounted to oscillate about said pivot, a joint directly connecting said lever to said connecting rod and adapted to vary the effective length of said lever, and a link connecting said lever to said sleeve.

6. In a two-cycle internal combustion engine, a cylinder having rows of inlet and exhaust ports at opposite ends, a tubular sleeve valve which is adapted to reciprocate in said cylinder and to control said ports and has inlet and exhaust slots at opposite ends, a controlling edge on said cylinder for cooperation with one group of slots in said sleeve, a piston mounted to reciprocate in said sleeve and having a controlling edge at its inner end for cooperation with the other group of slots in said sleeve, a connecting rod operatively connected to said piston, a fixed pivot, a lever mounted to oscillate about said pivot, a joint directly connecting said lever to said connecting rod and including a sliding member for varying the effective length of said lever, and a link connecting said lever to said sleeve.

7. In a two-cycle internal combustion engine, a cylinder having rows of inlet and exhaust ports at opposite ends, a tubular sleeve valve which is adapted to reciprocate in said cylinder and to control said ports and has inlet and exhaust slots at opposite ends, a controlling edge on said cylinder for cooperation with the exhaust slots in said sleeve, a piston mounted to reciprocate in said sleeve and having a controlling edge at its inner end for cooperation with the inlet slots in said sleeve, a connecting rod operatively connected to said piston, a fixed pivot, a lever mounted to oscillate about said pivot, a joint directly connecting said lever to said connecting rod and including a sliding member for varying the effective length of said lever, and a link connecting said lever to said sleeve.

8. In a two-cycle internal combustion engine, a cylinder having rows of inlet and exhaust ports at opposite ends, a tubular sleeve valve which is adapted to reciprocate in said cylinder and to control said ports and has inlet and exhaust slots at opposite ends, a controlling edge on said cylinder for cooperation with the exhaust slots in said sleeve, a piston mounted to reciprocate in said sleeve and having a controlling edge at its inner end for cooperation with the inlet slots in said sleeve, a connecting rod operatively connected to said piston, a fixed pivot arranged at that side of the connecting rod toward which said rod moves during the expansion stroke of the piston, a lever mounted to oscillate about said pivot, a joint directly connecting said lever to said connecting rod and including a sliding member for varying the effective length of said lever, and a link connecting said lever to said sleeve.

9. In a two-cycle internal combustion engine, a cylinder having rows of inlet and exhaust ports at opposite ends, a tubular sleeve valve arranged for reciprocation in said cylinder and formed with inlet and exhaust slots at opposite ends and with two controlling edges adapted for cooperation with the said exhaust and inlet ports of said cylinder, a controlling edge formed on said cylinder for cooperation with the exhaust ports of said sleeve valve, a piston arranged for reciprocation in said sleeve and being formed with a controlling edge for cooperation with the inlet ports of said sleeve, a connecting rod associated with said piston, a rock lever operatively associated with said sleeve, a stationary pivot for said lever, an oscillatory pivot for said lever formed on said connecting rod, said oscillatory pivot and said stationary pivot being so arranged relative to one another that during the expansion stroke and while the distance between said stationary and oscillatory pivots is substantially smallest, the distance between the said controlling edge on said cylinder and the said controlling edge on said piston is smaller than the distance between the two controlling edges of said sleeve, while, with the rock lever in the same position, during the compression stroke the distance between the stationary controlling edge on said cylinder and the controlling edge on said piston is larger than the distance between the said controlling edge of said cylinder and the controlling edge, arranged for cooperation with the top edge of said piston, on said sleeve.

BERNHARD BISCHOF.